(12) United States Patent
Yamamoto et al.

(10) Patent No.: US 11,293,150 B2
(45) Date of Patent: Apr. 5, 2022

(54) MARKER INSTALLATION METHOD AND MARKER INSTALLATION SYSTEM

(71) Applicant: AICHI STEEL CORPORATION, Tokai (JP)

(72) Inventors: Michiharu Yamamoto, Tokai (JP); Tomohiko Nagao, Tokai (JP); Hitoshi Aoyama, Tokai (JP); Masayoshi Fujiya, Tokyo (JP); Shin Takeuchi, Tokyo (JP); Hideto Takeishi, Tokyo (JP); Taizo Nishiyama, Tokyo (JP)

(73) Assignee: Aichi Steel Corporation, Tokai (JP)

( * ) Notice: Subject to any disclaimer, the term of this patent is extended or adjusted under 35 U.S.C. 154(b) by 96 days.

(21) Appl. No.: 16/770,646

(22) PCT Filed: Dec. 10, 2018

(86) PCT No.: PCT/JP2018/045359
§ 371 (c)(1),
(2) Date: Jun. 8, 2020

(87) PCT Pub. No.: WO2019/117097
PCT Pub. Date: Jun. 20, 2019

(65) Prior Publication Data
US 2020/0299909 A1    Sep. 24, 2020

(30) Foreign Application Priority Data

Dec. 12, 2017  (JP) .............................. JP2017-237525

(51) Int. Cl.
*E01C 23/16* (2006.01)
*E01F 11/00* (2006.01)
(Continued)

(52) U.S. Cl.
CPC ............ *E01C 23/163* (2013.01); *E01C 23/18* (2013.01); *E01C 23/24* (2013.01); *E01F 9/518* (2016.02);
(Continued)

(58) Field of Classification Search
CPC ........ E01C 23/163; E01C 23/18; E01C 23/24; E01F 9/518; E01F 11/00; G01C 3/18; G01C 15/06
See application file for complete search history.

(56) References Cited

U.S. PATENT DOCUMENTS

2004/0057795 A1    3/2004  Mayfield
2015/0247719 A1    9/2015  Huang
(Continued)

FOREIGN PATENT DOCUMENTS

AU          2488688 A       4/1989
CN       101095061 A      12/2007
(Continued)

OTHER PUBLICATIONS

Extended European Search Report for corresponding Application No. 18889422.4 dated Sep. 2, 2021.
(Continued)

*Primary Examiner* — Abigail A Risic
(74) *Attorney, Agent, or Firm* — Renner, Otto, Boisselle & Sklar, LLP

(57) ABSTRACT

An installation system has a laser range finder set at a reference position to measure a distance to a target, an installation cart which performs operation for laying a magnetic marker in a road, and an arithmetic unit which identifies a position relation of a laying position where the magnetic marker is laid with respect to the reference position. When operation for laying the magnetic marker in a road is performed, by taking the installation cart during
(Continued)

performing the operation of laying the magnetic marker in the road as a target, based on a distance to the installation cart measured by the laser range finder, the position relation of the laying position with respect to the reference position is identified by the arithmetic unit.

22 Claims, 8 Drawing Sheets

(51) Int. Cl.
*E01C 23/24* (2006.01)
*G01C 3/18* (2006.01)
*G01C 15/06* (2006.01)
*E01F 9/518* (2016.01)
*E01C 23/18* (2006.01)

(52) U.S. Cl.
CPC ............... *E01F 11/00* (2013.01); *G01C 3/18* (2013.01); *G01C 15/06* (2013.01)

(56) References Cited

U.S. PATENT DOCUMENTS

2018/0016758 A1* 1/2018 Dolinar .................... E01C 23/20
2019/0196496 A1* 6/2019 Yamamoto ............ B60W 30/12
2019/0339710 A1* 11/2019 Sorensen .............. G05D 1/0274
2020/0012294 A1* 1/2020 Yamamoto ........... G05D 1/0261
2020/0270826 A1* 8/2020 Dolinar ................. E01C 23/163

FOREIGN PATENT DOCUMENTS

| DE | 102014015442 A1 | 4/2016 |
| JP | 1-088277 A | 4/1989 |
| JP | 2000-276691 A | 10/2000 |
| JP | 2001303525 A | 10/2001 |
| JP | 2005-202478 A | 7/2005 |
| WO | 2007144678 A1 | 12/2007 |
| WO | 2017/141869 A1 | 2/2018 |

OTHER PUBLICATIONS

International Search Report for corresponding Application No. PCT/JP2018/045359, dated Jan. 22, 2019.
Written Opinion for corresponding Application No. PCT/JP2018/045359, dated Jan. 22, 2019.

* cited by examiner

[FIG. 1]
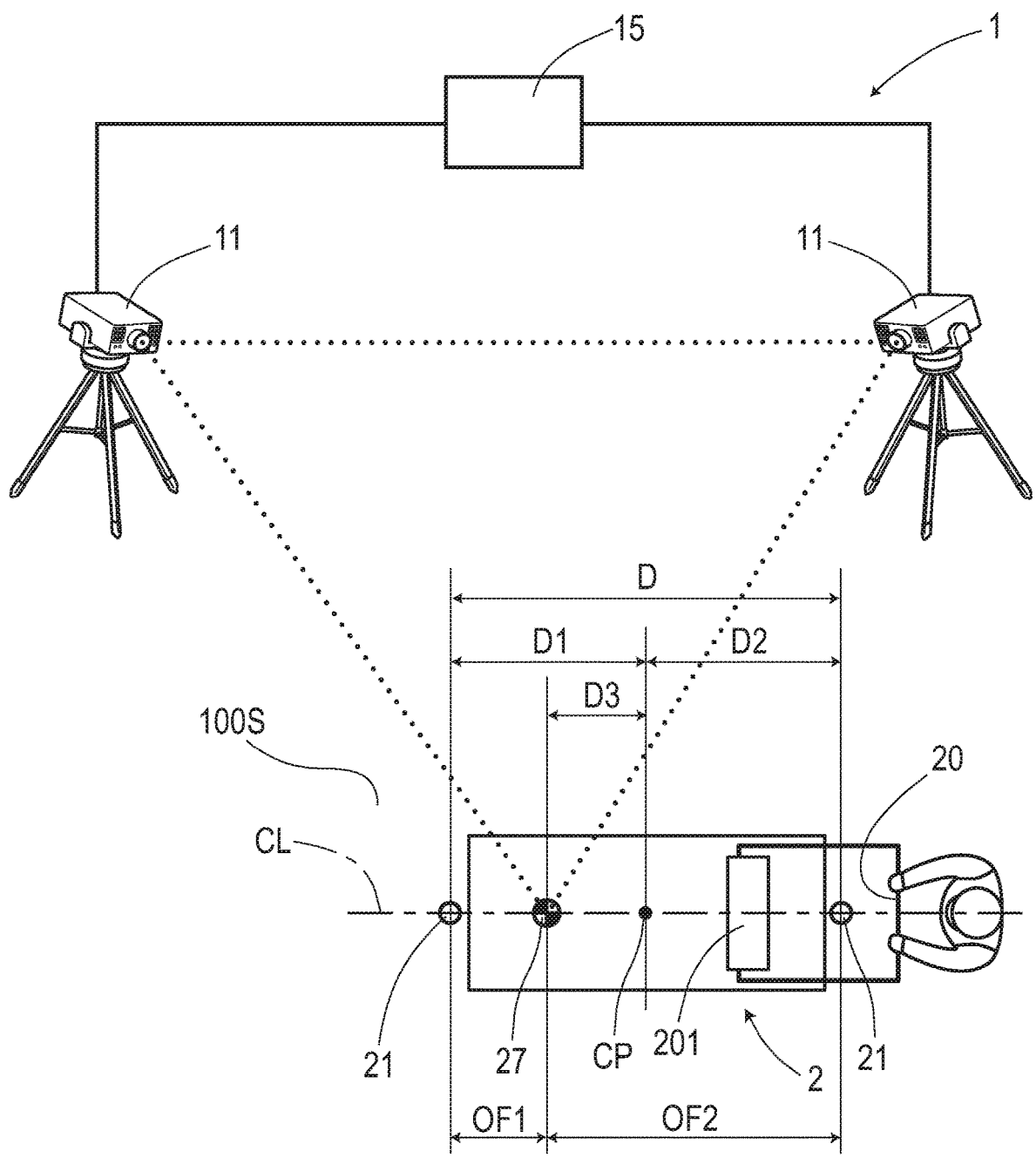

[FIG. 2]
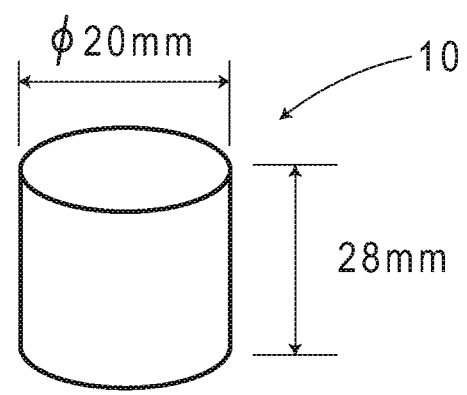

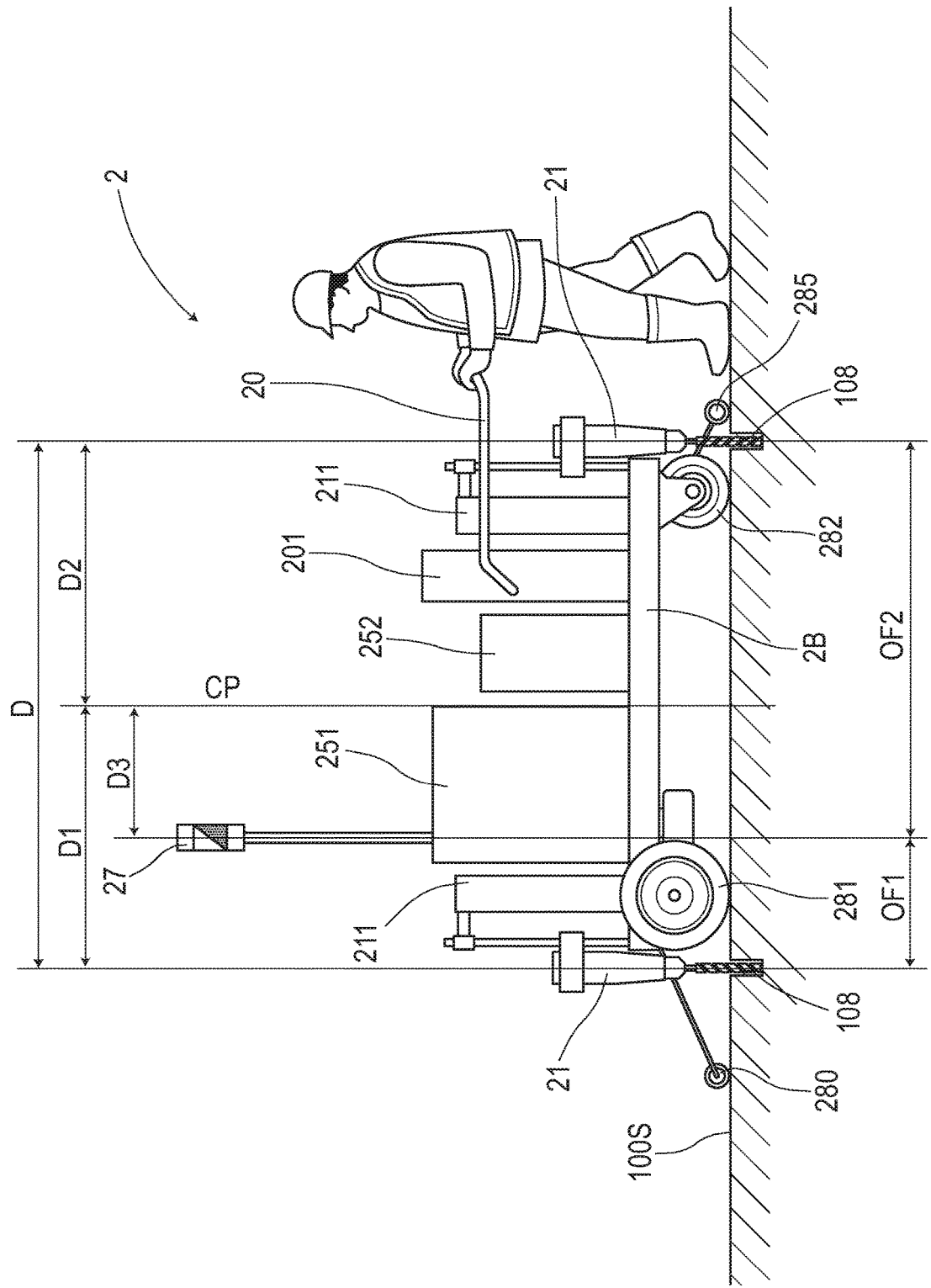
[FIG. 3]

[FIG. 4]
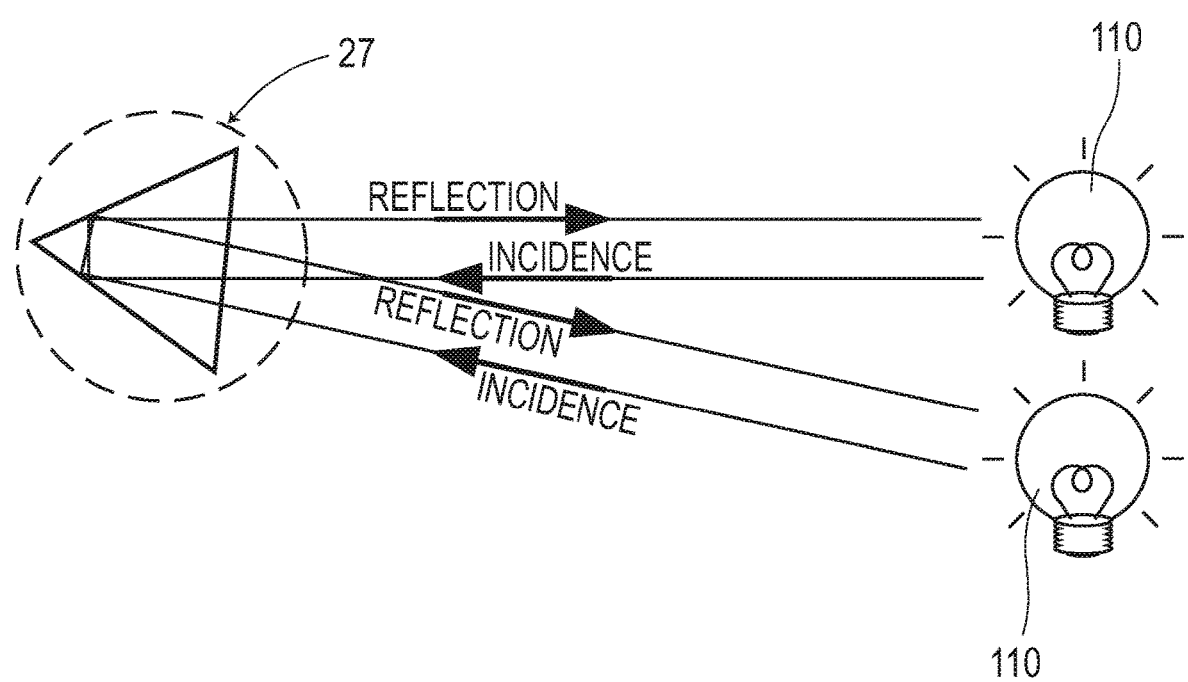

[FIG. 5]
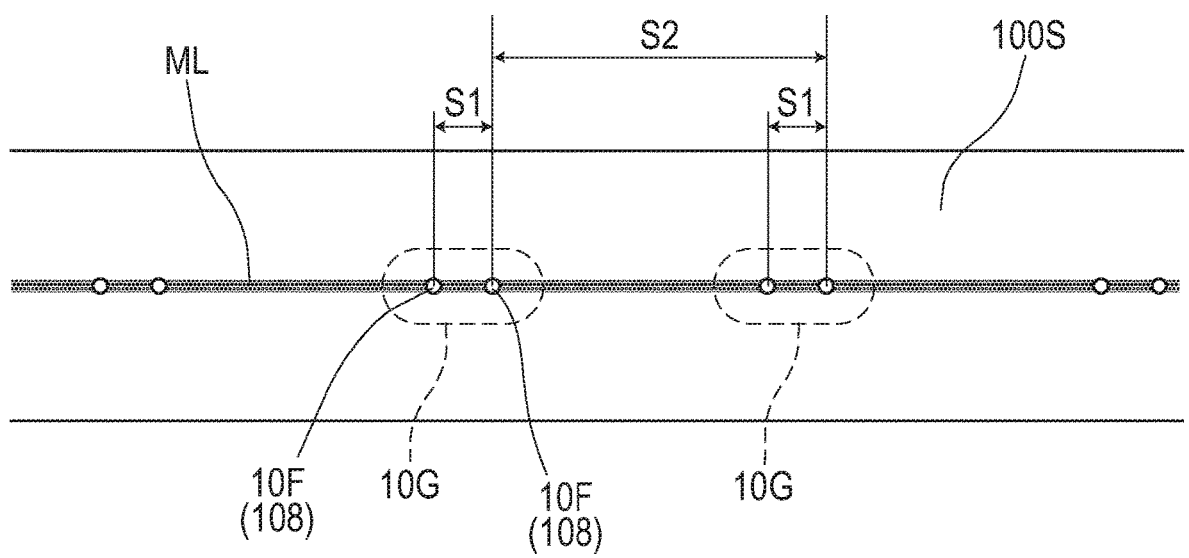

[FIG. 6]
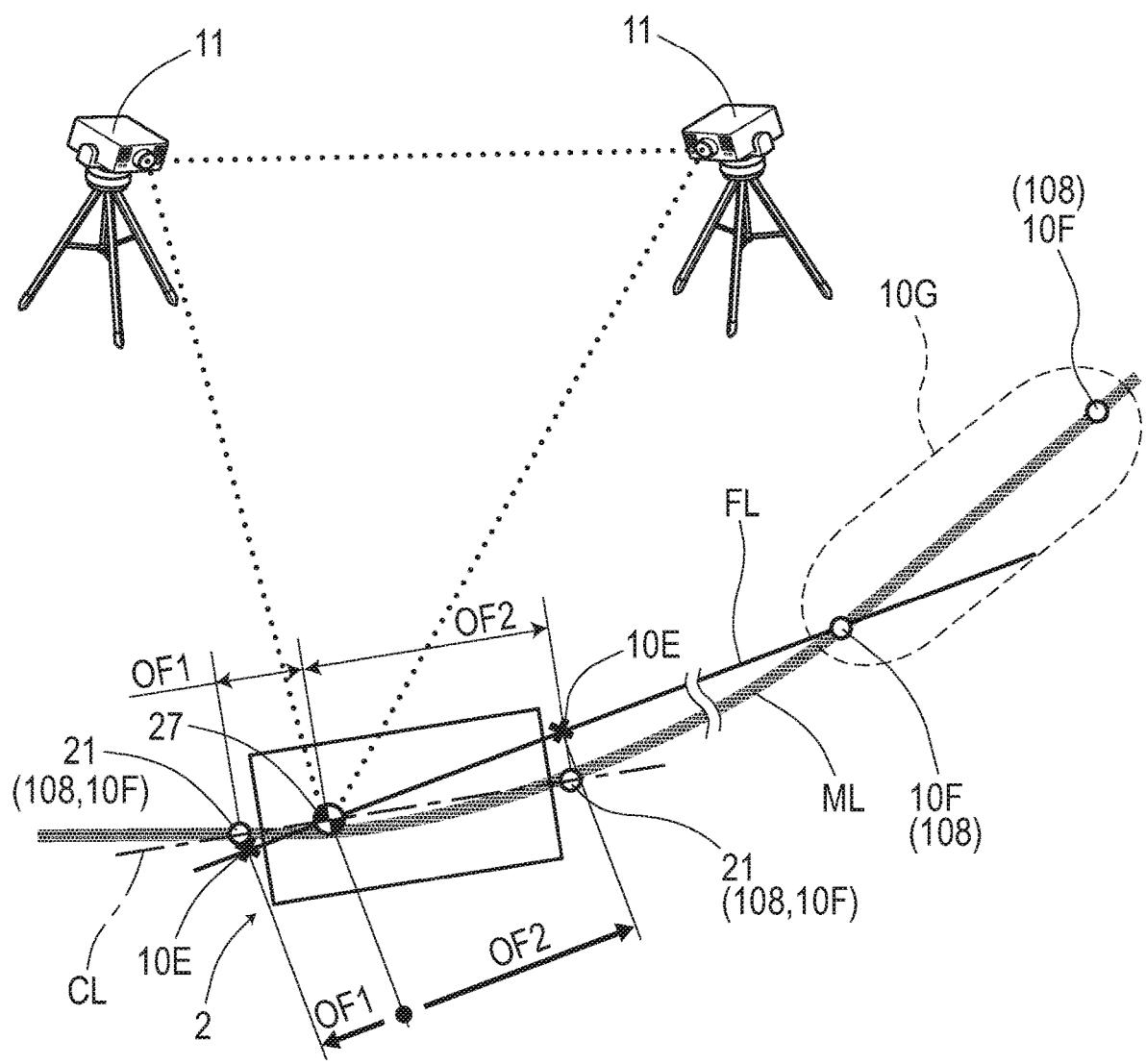

[FIG. 7]
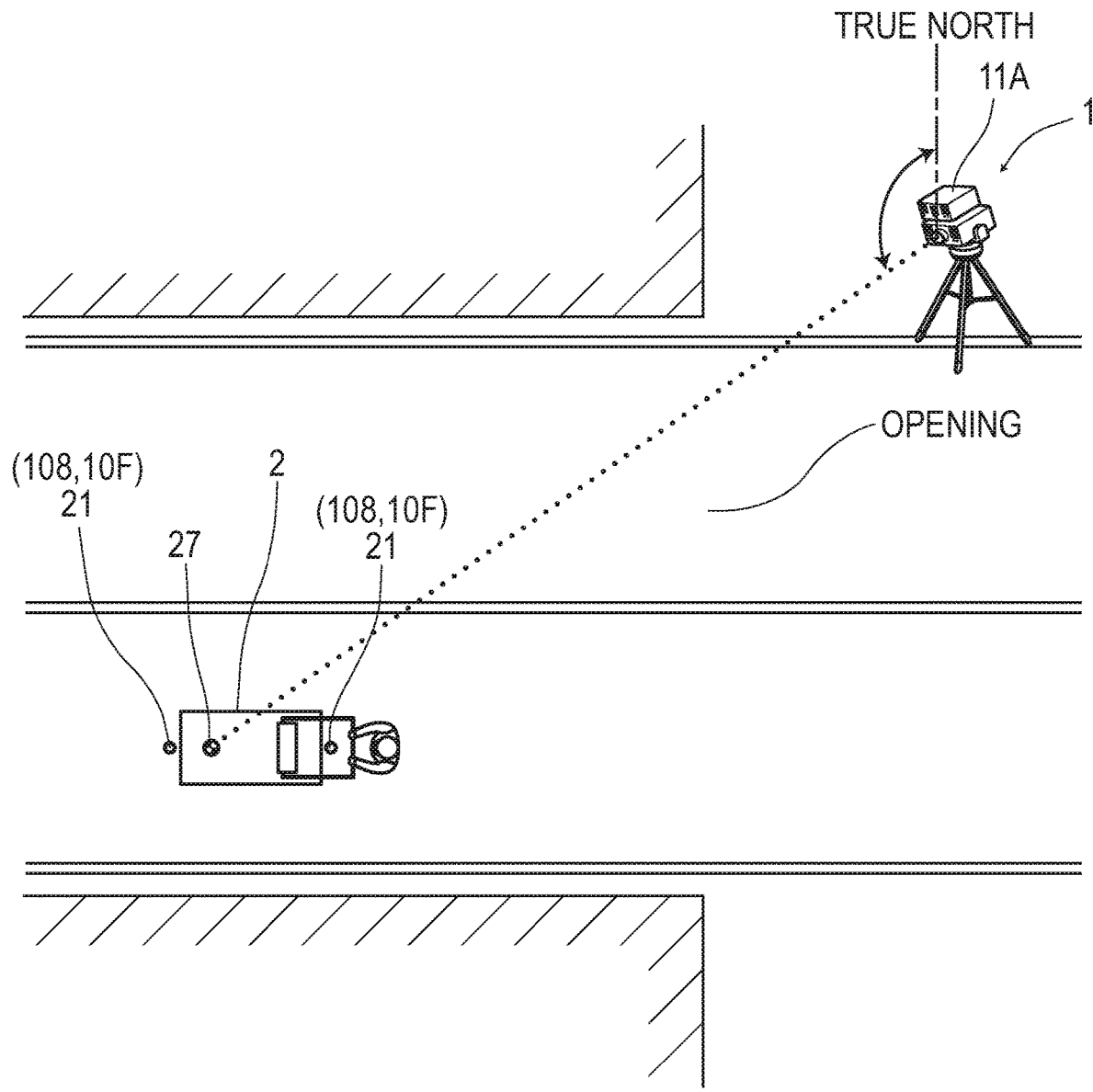

[FIG. 8]
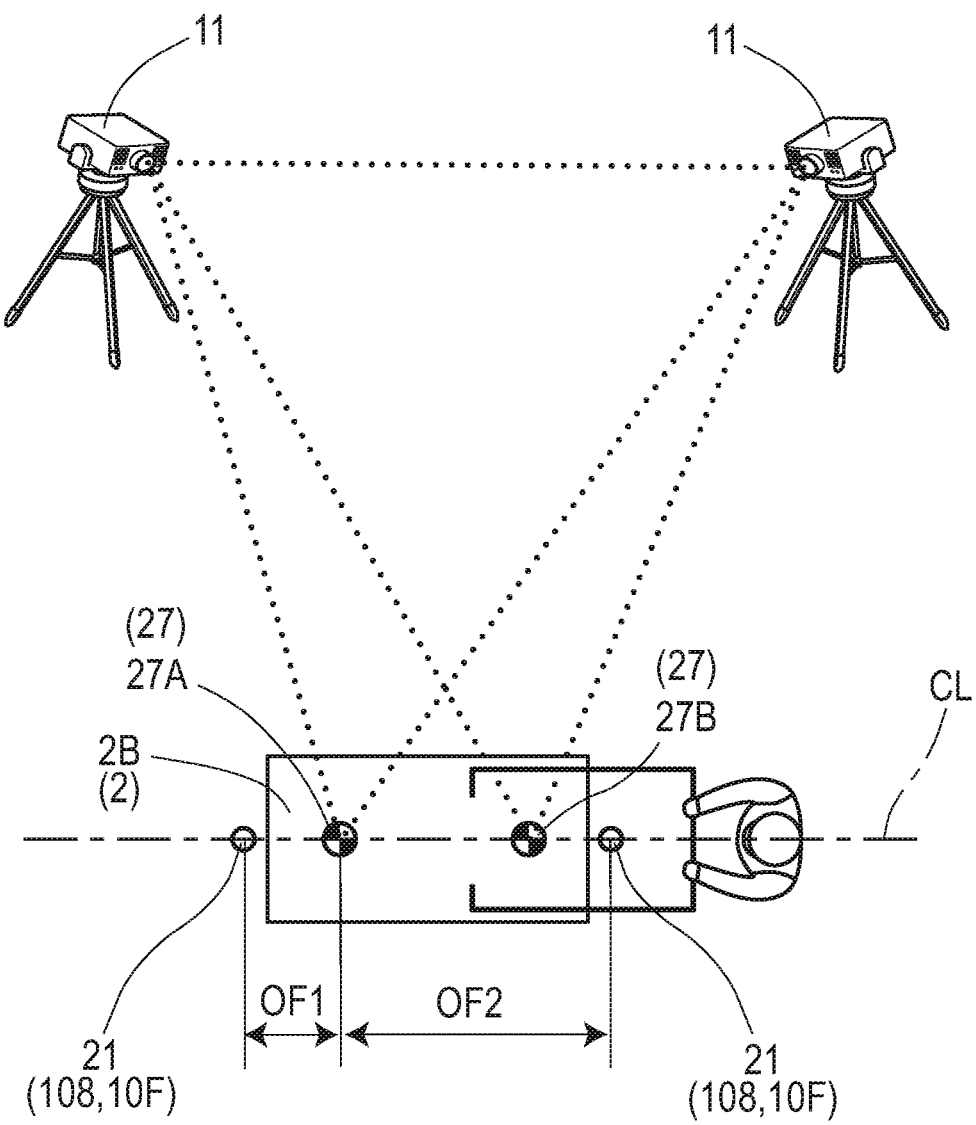

MARKER INSTALLATION METHOD AND MARKER INSTALLATION SYSTEM

TECHNICAL FIELD

The present invention relates to a marker installation method and a marker installation system for laying a marker in pavement or affixed facilities at a location where vehicles pass, such as a road, an airport, a harbor, a parking lot, a BRT (Bus Rapid Transit) line.

BACKGROUND ART

Conventionally, vehicular marker detection systems for detecting a magnetic marker laid in a road by a magnetic sensor attached to a vehicle have been known (for example, refer to Patent Literature 1). According to this marker detection system, various driving assists, such as automatic steering control, lane departure warning, and automatic driving using magnetic markers laid along a lane, can be achieved.

CITATION LIST

Patent Literature

Patent Literature 1: Japanese Unexamined Patent Application Publication No. 2005-202478

SUMMARY OF INVENTION

Technical Problem

However, the above-described conventional magnetic marker has the following problem. For example, to achieve driving assist such as lane departure warning, it is required to lay many magnetic markers at relatively short spacing with high position accuracy, thereby posing a problem in which installation cost tends to increase.

The present invention was made in view of the above-described conventional problem, and is to provide a marker installation method and an installation system capable of suppressing installation cost.

Solution to Problem

One aspect of the present invention resides in a marker installation method for laying a marker detected by a vehicle, the method including,
  setting a surveying device which measures a distance to a target at a reference position,
  when an operation for laying the marker is performed, measuring, by using the surveying device, a distance to an installation device which performs the operation for laying, and
  identifying a position relation of a laying position where the marker is laid with respect to the reference position.

One aspect of the present invention resides in a marker installation system for laying a marker detected by a vehicle, the system including,
  a surveying device set at a reference position to measure a distance to a target,
  an installation device including an operation unit which performs an operation for laying a marker, and
  a laying position identifying part which identifies a position relation of a laying position where the marker is laid with respect to the reference position, wherein
  the laying position identifying part is configured to identify the position relation of the laying position with respect to the reference position based on a distance to the installation device measured by the surveying device by taking the installation device performing the operation for laying the marker as a target.

Advantageous Effects of Invention

In the marker installation method and the marker installation system according to the present invention, at the time of the operation for laying markers, the distance to the installation device is measured by using the surveying device set at the reference position. And, by measuring the distance from the reference position to the installation device in this manner, the position relation of the laying position with respect to the reference position is identified.

With this marker installation method and so forth, it is not required to, for example, survey the laying position with high accuracy before installation and position the installation device at that position with high accuracy. Saving operation relatively requiring time and effort such as survey of the laying position and positioning of the installation device is effective in suppressing installation cost.

As described above, the marker installation method and the marker installation system according to the present invention is a useful method or system capable of suppressing installation cost.

BRIEF DESCRIPTION OF DRAWINGS

FIG. 1 is a structural diagram of an installation system in the first embodiment.

FIG. 2 is a diagram depicting a magnetic marker in the first embodiment.

FIG. 3 is a side view of an installation cart in the first embodiment.

FIG. 4 is a descriptive diagram of a survey prism in the first embodiment.

FIG. 5 is a descriptive diagram of laying specifications of magnetic markers in the first embodiment.

FIG. 6 is a descriptive diagram of a method of identifying a laying position in the first embodiment.

FIG. 7 is a descriptive diagram of an installation method in a second embodiment.

FIG. 8 is a descriptive diagram of an installation method in a third embodiment.

DESCRIPTION OF EMBODIMENTS

As a surveying device in the present invention, for example, there are a device which detects a delay time after laser light is emitted until reflected light is received to measure a distance, a device which detects the delay time after electric waves such as millimeter waves are emitted until reflected electric waves are received to measure the distance, a device which detects a position shift amount between images of the same target taken by two cameras configuring a stereo camera to measure the distance and so forth.

As the surveying device, for example, a device with an identified irradiation direction of laser light or an identified azimuth of the optical axis direction of the camera may be used, or a device with these directions not identified may be used. For example, if the surveying device has the irradiation direction of laser light with respect to true north or the like identified, the azimuth of true north can be a reference azimuth, and thus the azimuth where the target is positioned can be identified. With this surveying device, for example, by measuring the distance and azimuth to the installation device by the surveying device set at a reference position at one location, a position relation of a laying position with respect to the reference position can be identified. On the other hand, if the surveying device has the unidentified irradiation direction of laser light and so forth, by triangulation or the like, based on the distances measured by, for example, the surveying devices set at reference positions at two locations, the position relation of the laying position can be identified with respect to the reference positions at the two locations.

As a marker in the present invention, there is a magnetic marker, which is an active-type marker generating, for example, magnetism or the like, and, a passive-type marker such as, for example, an embedded tile recognizable as an image, and so forth.

In the present invention, the reference position where the surveying device is set may be a position with its absolute position identified, such as a reference point or an electronic reference point set and managed by Geospatial Information Authority of Japan or prefectures, a position with its relative position identified with respect to a road structure such as an intersection, fork, curb, or a manhole, or a position of a marking or the like created on the road structure or a road surface.

In the present invention, the operation for laying the marker may be, in addition to the operation of arranging the marker in, for example, the road surface of the road, for example, preparing operation for laying the marker, such as boring an accommodation hole for the marker or providing a mark for identifying the laying position on the road surface or the like. In the operation for laying the marker, completion of marker laying is not imperative. For example, even if marker laying is not completed, by performing the operation of boring the accommodation hole, the position of that accommodation hole is determined as a marker laying position.

Embodiments of the present invention are specifically described by using the following examples.

First Embodiment

The present embodiment is an example of an installation method of laying a magnetic marker 10 as one example of a marker in a road and an installation system 1 which performs this installation method. Details of this are described by using FIG. 1 to FIG. 6.

The present embodiment is, as in FIG. 1, an example of the installation method by the installation system 1 including an installation cart (installation device) 2 which lays the magnetic marker 10 (FIG. 2) in the road, a laser range finder (surveying device) 11 which measures the distance to the installation cart 2, and an arithmetic unit (laying position identifying part) 15 which performs an arithmetic process for identifying the laying position of the magnetic marker 10. In this installation method, while operation for laying the magnetic marker 10 is efficiently performed while allowing a positional error, the laying position of the magnetic marker 10 is identified by surveying or the like while this laying operation is performed.

In this installation method, prior to the operation of laying the magnetic marker 10, it is not required to, for example, accurately position the installation cart 2 with respect to the laying positions, and the laying operation can thus be efficiently performed. In particular, when the magnetic marker 10 is laid later in the operated road, the period required for closing the road to vehicular traffic can be shortened, and social cost spent for installation of the magnetic markers 10 can be reduced. Note that the road of the present embodiment is a vehicle's traveling road paved and provided with pavement on a surface side. And, the surface of this pavement is the road surface 100S where the magnetic markers 10 are laid.

In the following, details of the installation system 1 and the installation method of the present embodiment are described.

First, a general outline of the magnetic marker 10 as an installation target is described. The magnetic marker 10, for example, is a small-sized marker forming a columnar shape having a diameter of 20 mm and a height of 28 mm, as in FIG. 2. A magnet forming the magnetic marker 10 is an isotropic ferrite plastic magnet formed by dispersing a magnetic powder of iron oxide as a magnetic material in a polymer material as a base material, and has a characteristic of a maximum energy product (BHmax)=6.4 kJ/m$^3$. Note that the magnetic marker to be installed may be, for example, a sheet-shaped magnetic marker having a diameter of 100 mm and a thickness of 1 mm.

The magnet of the magnetic marker 10 is a magnet with a magnetic flux density of the surface being 45 mT (millitesla) and the magnetic flux density reaching a height of 250 mm from the surface being on the order of 8 µT. The magnet as an isotropic ferrite plastic magnet has a magnetic material being iron oxide, and is thus resistant to corrosion and not required to be accommodated in a metal-made case or the like. The magnetic marker 10 can be directly accommodated and laid in a small accommodation hole having, for example, a diameter of 25 mm to 30 mm and a depth on the order of 35 mm to 40 mm.

Next, the installation cart 2 of FIG. 1 and FIG. 3 is the installation device which performs laying operation of boring the accommodation hole 108 for the magnetic marker 10 in the road surface 100S, and includes one boring drill (one example of an operating unit) 21 at each of the front and rear of a vehicle body 2B. This installation cart 2 is a four-wheel vehicle including two driving wheels 281 at left and right on the front side of the vehicle body 2B and two freewheels 282 at left and right on a rear side. The driving wheels 281 at left and right on the front side can be individually driven, and can change the orientation of the installation cart 2 in accordance with the rotation difference. As for the freewheels 282 at left and right on the rear side, the direction of the wheels can be freely changed in accordance with the orientation of the installation cart 2. Note that the configuration of the wheels of the installation cart 2 may be a three-wheel configuration or six-wheel configuration.

At the rear part of the vehicle body 2B of the installation cart 2, a hand push handle 20 extending rearward over the boring drill 21 on the rear side is provided. An operator can move the installation cart 2 by walking while pushing the hand push handle 20. The hand push handle 20 is supported in a cantilever manner by an operation unit 201 including a sensor, not depicted, for sensing operation forces of both hands of the operator. In accordance with operation forces acting on this hand push handle 20, the driving wheels 281 are rotationally driven, thereby causing appropriate assist force. Thus, the operator can move the installation cart 2 with a relatively light force.

On the front side of the vehicle body 2B, a guide roller 280 is attached to facilitate visual confirmation as to, for example, whether the vehicle body 2B goes along a line as a target. On the rear side of the vehicle body 2B, a road counter roller 285 is attached for integration measurement of moving distances. The moving distance measured by integration measurement by using the road counter roller 285 is displayed on a display panel, not depicted, facing the operator operating the hand push handle 20.

The installation cart 2 includes, as in FIG. 3, in addition to the above-described front and rear boring drills 21, a power generator 251 which uses light oil as a fuel, a driving cylinder 211 which drives the boring drills 21 in a vertical direction, a suction cleaner 252 which collects dust such as cuttings and so forth. The boring drills 21 have their positions on a horizontal plane along the road surface 100S constantly held with respect to the vehicle body 2B, and are driven by the driving cylinder 211 to advance and retreat in the vertical direction. The front and rear boring drills 21 are positioned on a center line CL (refer to FIG. 1) of the vehicle body 2B, and are each 1 m away from a center CP of the vehicle body 2B in a longitudinal direction (spans D1 and D2 are both 1 m). Therefore, a space between the front and rear boring drills 21 in the installation cart 2 is a span D=2 m.

Furthermore, on the front part of the vehicle body 2B, a survey prism 27 is provided in a standing manner to reflect laser light for surveying. The survey prism 27 forming a measurement point by the laser range finder 11 is an optical device which matches a light incident direction and a reflecting direction and, as in FIG. 4, can reflect light toward a light source 110 irrespective of the position of the light source 110.

The survey prism 27 is, as in FIG. 1 and FIG. 3, positioned on the center line CL of the vehicle body 2B, and is positioned as being shifted by 50 cm from the center CP of the vehicle body 2B to the front side (span D3=50 cm). That is, the survey prism 27 is positioned 50 cm rearward with reference to the front-side boring drill 21 and 1 m 50 cm forward with reference to the rear-side boring drill 21.

Offset amounts (OF1 and OF2 in FIG. 1 and FIG. 3) representing that the front-side boring drill 21 is 50 cm ahead of the survey prism 27 and the rear-side boring drill 21 is 1 m 50 cm behind the survey prism 27 are set in advance in an arithmetic unit 15 as parameters indicating relative positions of the boring drills 21 with respect to the survey prism 27.

Note that the survey prism 27 can be used in a mode having a light receiving part positioned extremely near the road surface and a rod-shaped member for carriage is provided in a standing manner on its upper surface. Here, the rod-shaped member for carriage is a metal-made or resin-made rod-shaped member structured to be able to fix the survey prism 27 at one end part. In this case, with the one end part of the rod-shaped member for carriage with the survey prism 27 fixed thereto being installed on the road surface side, a deviation between the laying positions of the magnetic markers and the light receiving part can be minimized. This allows reduction in operation time when, in particular, to install the magnetic marker 10 in a hole bored at the laying position, the operator holds the rod-shaped member by hand to lay out the position.

Note that the operation of laying the magnetic markers 10 is performed by using, in addition to the installation cart 2 of FIG. 3 for boring the accommodation holes 108, an installation cart (not depicted) which arranges the magnetic markers 10 one by one in the accommodation holes 108, an installation cart (not depicted) which finishes the road surface 100S after arrangement of the magnetic markers 10 and so forth. The installation cart for arrangement is an installation device to arrange the magnetic markers 10 in the accommodation holes 108 and supply a pavement material as an adhesive. The installation cart for finishing the road surface is an installation device which performs operation of cutting a superfluous pavement material swelling from the perimeter of the pavement material after curing the pavement material supplied to the accommodation holes 108 to smooth the road surface 100S or lays an adhesion-type or weld-type protective sheet. Note that as a specific example of the pavement material as an adhesive, a resin-base, asphalt-base, or cement-base pavement material excellent in quick-drying ability, durability, water tightness and so forth is preferably used.

Next described are the laser range finder 11 and the arithmetic unit 15 for identifying the boring position of each accommodation hole 108 by the installation cart 2 of FIG. 3, that is, the laying position where the magnetic marker 10 is to be laid, by surveying.

The laser range finder 11 (FIG. 1) is a surveying device which measures the distance to a target by using laser light. The laser range finder 11 measures the distance to the target by measuring the delay time of laser light after light emission until the light returned as being reflected by the target. The laser range finder 11 measures the delay time until reflected light is received from the survey prism 27 (refer to FIG. 1 and FIG. 3) as a measurement point provided in a standing manner in the installation cart 2, and outputs the distance to the installation cart 2. In the installation system 1, the laser range finders 11 are set respectively at two reference positions with their absolute positions already known.

The arithmetic unit 15 (FIG. 1) is a unit which uses two distances inputted from the laser range finders 11 set at the reference positions at two locations to identify the relative position relation of the laying position with respect to the reference positions. In the arithmetic unit 15, in addition to position data of the reference positions at two locations, data necessary for identifying the laying position are set in advance, such as the above-described parameters indicating the offset amounts (OF1 and OF2 in FIG. 1) of the boring drills 21 with respect to the survey prism 27.

Next, details of the method of installing the magnetic markers 10 by the above-configured installation system 1 are described along the procedure of operation.

To perform the operation of laying the magnetic markers 10, as a preparation, a marking line ML (refer to FIG. 5), which is a target line for laying the magnetic markers 10, is formed on the road surface 100S, and the laser range finders 11 are set at the reference positions at two locations where the installation carts 2 during laying operation can be viewed (refer to FIG. 1).

The marking line ML of FIG. 5 can be formed by, for example, a vehicle equipped with a tank which stores a marking fluid, which is a material for forming the marking line ML, and a dropping device which drops the marking fluid onto the road surface and so forth. If this vehicle is caused to travel along a traveling path such as a lane as an installation target, the marking line ML, which is a target line for laying the magnetic markers 10, can be formed.

Note that, for example, the dropping device has a pump-equipped atomizer set therein, thereby allowing the liquid for marking to be dropped onto the road surface. As the marking fluid for marking for forming the marking line ML, for example, ink or paint can be adopted. In particular, a red food coloring is preferably used. If the red food coloring is used, a harmless, safe, and clear marking line ML can be formed (laid out). Since the red food coloring is watersoluble and the marking line ML disappears within several days, passing vehicles are not affected.

Also, to form the marking line ML along the road with high position accuracy, a rod-shaped member overhanging sideward is preferably attached to the vehicle equipped with the dropping device and a chain or the like is preferably hung at an end part of the rod-shaped member. If the vehicle is caused to travel so that this chain or the like hung down from the end part of the rod-shaped member goes along an outer side line, center line, or the like, the position accuracy when the marking line ML is formed can be ensured. Alternatively, the vehicle equipped with the dropping device is also preferably caused to be actually driven by a driver to form the marking line ML.

As the reference positions for setting the laser range finders 11, for example, positions with their absolute positions measured with high accuracy in advance by using a Global Positioning System (GPS) can be used. The reference positions (refer to FIG. 1) at two locations where the laser range finders 11 are to be set, are both required to be positions from which the operating installation cart 2 can be viewed.

By the operator performing operation of pushing the installation cart 2 by hand along the above-described marking line ML, the operation of boring the accommodation holes 108 can be performed. For example, if the installation cart 2 is stopped every time the moving distance measured by integration measurement by the road counter roller 285 is incremented by 10 m to operate the boring drills 21 and the driving cylinder 211, as in FIG. 5, laying locations 10G can be successively provided with a span S2=10 m along the marking line ML. Here, if the front and rear boring drills 21 and so forth are each operated during stopping of the installation cart 2, the accommodation holes 108 (laying positions 10F) adjacent to each other with a span S1=2 m, which matches the span D, between the boring drills 21, can be formed at two locations for the respective laying locations 10G.

When the installation cart 2 performs laying operation at one laying location 10G, each of the laser range finders 11 at two locations measure the distance to the installation cart 2 (refer to FIG. 1 and FIG. 6). Each laser range finder 11 emits laser light toward the survey prism 27 forming the measurement point, and measures the distance by the delay time until reflected light is received. The distance to the installation cart 2 measured by each laser range finder 11 is inputted to the arithmetic unit 15.

The arithmetic unit 15 (FIG. 1) uses two distances acquired from the laser range finders 11 set at reference positions at two locations to identify a relative position of the survey prism 27 with respect to the reference positions. The arithmetic unit 15 identifies a triangle defined by the distance between two reference positions with their absolute positions already known, the distance between one reference position and the survey prism 27, and the distance between the other reference position and the survey prism 27 (refer to FIG. 1 and FIG. 6), identifying the relative position relation of the survey prism 27 with respect to the reference positions at two locations and thereby identifying the absolute position of the survey prism 27.

Here, as described above, in the arithmetic unit 15, parameters indicating the arrangement of the boring drills 21 such as the offset amounts (OF1=50 cm and OF2=1 m 50 cm in FIG. 6) of the boring drills 21 with respect to the survey prism 27 are set in advance. If these parameters are used, as in FIG. 6, by shifting the absolute position of the survey prism 27 by the above-described offset amounts (OF1 and OF2), the positions of the accommodation holes 108 at two locations by the front and rear boring drills 21, that is, the absolute positions of the laying positions 10F, can be identified.

When the laying position 10F is identified with reference to the absolute position of the survey prism 27, as in FIG. 6, a line segment FL is assumed, which connects the laying position 10F on an upstream side where the operation of boring the accommodation hole 108 has been completed and the position has already been identified, and the absolute position of the survey prism 27. Along this line segment FL, the arithmetic unit 15 shifts the absolute position of the survey prism 27 by the offset amounts (OF1 and OF2) indicated by the parameters to identify the absolute position of the laying position. Position information of the absolute positions of the laying positions 10F identified in this manner is sequentially stored in a database not depicted, and is accumulated as laying information of the magnetic markers 10.

Note that herein in the road or the like where the curvature varies, there is a possibility that the line segment FL may be shifted from the center line CL (refer to FIG. 6) of the installation cart 2. In this case, the laying position identified as described above can be, strictly, shifted from the actual laying position 10F to become the position of a survey position 10E. While this shift is depicted as being emphasized in FIG. 6, this shift is suppressed in an express way, a major road and so forthwith smooth variations of curvature, and thus there is less fear of posing a problem.

As described above, in the installation method of the present embodiment, by measuring the distances from the reference positions to the operating installation cart 2, the boring positions of the accommodation holes 108 as the laying positions 10F of the magnetic markers 10 are identified. Since this is a method capable of identifying the laying positions 10F without assuming positioning the installation cart 2 by GPS or the like, even in a place where GPS electric waves tend to be unstable such as an intermontane road or a place between buildings, the laying positions 10F of the magnetic markers 10 can be identified.

With this installation method, it is not required to, for example, highly-accurately position the boring drill 21 of the installation cart 2 with respect to the laying position identified in advance and time and effort for operation are less, and thus the laying operation can be performed relatively efficiently. Therefore, according to this installation method, by suppressing time and effort for laying operation, installation cost of the magnetic markers 10 can be reduced.

Note that if the environment is such that GPS electric waves are stably receivable, it is also effective to measure the absolute position of the installation cart 2 by using a highly-accurate positioning system such as, for example, RTK (RealTime Kinematic)-GPS. A positioning unit using RTK-GPS may be preferably additionally provided to the installation cart 2. With this installation cart 2, in accordance with the reception condition of GPS electric waves, either of positioning by using GPS or positioning by the present embodiment is selectively used, thereby allowing the operation of laying the magnetic markers 10 to be performed more efficiently.

While the installation cart 2 which includes the boring drills 21 at the front and rear and is capable of boring the accommodation holes 108 at two location without moving has been exemplarily described, an installation cart with only one boring drill 21 or an installation cart including three or more boring drills 21 may be used.

In the case of one boring drill 21, only one location may be bored for the accommodation hole 108, or a plurality of accommodation holes 108 may be able to be bored by the boring drill 21 moving in a horizontal plane along the road surface 100S. Also, in the case of one boring drill 21, in the horizontal plane along the road surface 100S, the boring drill 21 and the survey prism 27 are preferably arranged at the same position or arranged as closely as possible. When a plurality of accommodation holes 108 are provided by one boring drill 21, for each accommodation hole 108, the relative position with respect to the survey prism 27 is preferably required to be known. Also, in the case of three or more boring drills 21, the boring drills 21 need not be arrayed on one straight line. Three boring drills 21 may be provided so as to form, for example, a triangle.

Note that when a deviation occurs in the laying position of the magnetic marker laid by the installation method of the present embodiment, position correction is preferably made on a vehicle side, which acquires a position by using the magnetic marker. For example, if a database storing deviation information in the laying position linked to identification information about the magnetic marker is adopted, position correction when the magnetic marker is detected can be made on the vehicle side such as, for example, automatic-driving vehicle, thereby allowing driving assist control such as highly-accurate automatic driving. Note that the above-described database may be provided in, for example, a storage device such as a hard disk included in the vehicle, or may be provided in, for example, a server device to which the vehicle is connectable via wireless communication or the like.

When markers are laid in the road, the markers can be arranged, for example, along the direction of the road. On the other hand, when markers are laid in a two-dimensional area such as an airport or a parking lot, the markers may be arranged in a grid pattern. In this case, an arrangement space of the markers can be flexibly set in accordance with the circumstances.

As for the installation cart 2, the diameter of the boring drill and the depth of boring are preferably adjustable. The diameter is adjustable if, for example, boring drills of a plurality of types with different diameters are prepared and any of the boring drills is selectively used. Alternatively, for example, a boring drill including a diameter adjusting mechanism may be adopted. Alternatively, if the boring drill's range of advancing and retreating in an axial direction is adjusted as appropriate, the depth of boring by the boring drill can be adjusted.

In the present embodiment, as a target for laying the magnetic markers 10, pavement forming the surface side of the road is exemplarily described. The target where the magnetic marker 10 are to be laid is not limited to the pavement of the road. The target for laying the magnetic markers 10 may be pavement forming a traveling area of vehicles provided in a harbor or an airport, pavement forming a parking lot, or the like.

Second Embodiment

The present embodiment is an example in which, as for the installation system of the first embodiment, the configuration of the system is changed so as to support installation in a tunnel. Details of an installation system 1 and an installation method of the present embodiment are described with reference to FIG. 7.

In the case of an installation site with both ends open and its inside viewable only from its openings, such as a tunnel, it is difficult to set surveying devices (laser range finders 11 in FIG. 1) at the reference positions at two locations from which the installation cart 2 is viewable. This is because, while the position measured with high accuracy by using GPS is suitable for the reference position, difficulty in setting the reference position is increased inside the tunnel where GPS electric waves are not receivable.

Thus, the installation system 1 of the present embodiment is configured to include a surveying device 11A including a function of measuring the direction of laser light with respect to true north. This surveying device 11A includes, in addition to the configuration of the laser range finders 11 of the first embodiment, a highly-accurate gyro compass unit which identifies the azimuth of true north and so forth. According to the surveying device 11A, in addition to the distance to the installation cart 2, the azimuth where the survey prism 27 is positioned can be measured with respect to true north.

If the surveying device 11A is set at one reference position with its absolute position already known to measure a distance to the installation car 2 and an azimuth where the installation cart 2 is positioned, the absolute position of the installation cart 2 can be identified with reference to the reference position. For example, if the surveying device 11A is set at a position where GPS electric waves are receivable, such as at the opening of the tunnel as in FIG. 7, the absolute position of the installation cart 2 performing laying operation inside the tunnel can be identified. This allows the boring position of the accommodation hole 108 provided by the boring drill 21, that is, the laying positions 10F (absolute position) of the magnetic marker, to be identified.

Note that other configurations and operations and effects are similar to those of the first embodiment.

Third Embodiment

The present embodiment is an example in which, as for the installation system of the first embodiment or the second embodiment, the survey prism 27 is additionally provided to the installation cart 2. Details of the installation system and the installation method of the present embodiment are described with reference to FIG. 8.

In the installation cart 2 of the present embodiment, two survey prisms 27A and 27B are arranged on the center line CL of the vehicle body 2B. If the surveying device 11 or 11A of the first embodiment or the second embodiment is used, each of the absolute positions of the two survey prisms 27A and 27B can be identified, allowing the absolute azimuth of the center line CL indicating the orientation (attitude) of the vehicle body 2B to be identified.

In the installation cart 2 of the present embodiment, the survey prisms 27A and 27B and the boring drills 21 are all arranged on the center line CL. If arithmetic process of shifting the position by the offset amounts (OF1 and OF2) along the center line CL with reference to the absolute position of the front-side survey prism 27A is performed, the absolute positions of the boring drills 21 can be identified with high accuracy. And, this allows the absolute positions of two accommodation holes 108 provided by the boring drills 21, that is, two laying positions 10F, to be identified with high accuracy.

Furthermore, if the absolute azimuth of the center line CL indicating the orientation of the vehicle body 2B when the accommodation holes 108 are bored can be identified, the absolute azimuth of a line segment connecting two laying positions 10F provided by the front and rear boring drills 21 can be identified. If the absolute azimuth of the line segment connecting two laying positions 10F is identified, in operation of the road where the magnetic markers are laid, a traveling direction of the vehicle passing over these laying positions 10F and so forth can be detected with high accuracy.

The installation cart may have three boring drills 21 arranged so as to form, for example, a triangle. In this case, by identifying the orientation of the installation cart, the orientation (attitude) of the triangle made by three laying positions formed by these three boring drills 21 can be identified. The orientation of the triangle can be represented by a deviation angle with respect to the azimuth serving as a reference for, for example, any side of the triangle, a bisector equally dividing the angle of any apex, or the like.

When distances to two survey prisms 27A and 27B are each measured by the laser range finder 11, it may be configured such that the survey prisms 27A and 27B are distinguishable in the laser range finder 11. For example, color filters may be provided to the survey prisms 27A and 27B to reflect light with a specific frequency. If frequency characteristics of the color filters of two survey prisms 27A and 27B differ, the frequency distributions of reflected light of the survey prisms 27A and 27B differ. On the laser range finder 11 side, from which survey prism 27 the reflected light has come can be identified in accordance with the frequency distribution of the reflected light. A shutter for blocking light may be provided to the survey prism 27, and the shutter may be alternately released in the two survey prisms 27A and 27B. In this case, distance measurements by the two survey prisms 27A and 27B can be performed in a time division manner.

Note that other configurations and operations and effects are similar to those of the first embodiment or the second embodiment.

Fourth Embodiment

The present embodiment is an example of an installation system based on the configuration of the first embodiment. In a marker installation method by this installation system, automation of operation is achieved.

The magnetic marker installation method of the present embodiment is, as with the first embodiment, an installation method including the following steps.

(1) A step of forming the marking line (one example of a marker laying line, and the marking line ML in FIG. 5 and FIG. 6) indicating the laying position of the magnetic marker on the road surface.
(2) A step of setting an installation device with reference to the marking line.
(3) A step of performing operation for laying the magnetic marker.

Here, as with the first embodiment, the above-described step (1) is a step to be performed while a vehicle (hereinafter, print vehicle) equipped with a tank which stores the marking fluid, which is a material for forming the marking line, and the dropping device which drops the marking fluid onto the road surface is traveling. The print vehicle of the present embodiment is different from the vehicle in the first embodiment in including an automated traveling function. The configuration included in the print vehicle to achieve the automated traveling function will be described further below.

Also, the installation device at the above-described step (2) is different from the installation cart of the first embodiment by the operator performing pushing operation by hand. The installation device of the present embodiment is an installation vehicle including a traveling mechanism for movement and a control unit which controls the traveling mechanism part. And, the above-described step (2) of setting the installation device is performed by the control part of the installation vehicle controlling the traveling mechanism part. In particular, this installation vehicle includes a function of automated traveling along the marking line ML, and is thereby different from the installation vehicle of the first embodiment. The configuration included in the installation vehicle to achieve the automated traveling function will be described further below.

The print vehicle includes a device which recognizes a lane mark (white line) such as a center line and an outer side line, which are demarcation lines for a lane. This device is configured to include a camera which takes an image ahead of the vehicle, an image processing part which performs image processing on the image taken by the camera, a recognition part which recognizes lane marks, an arithmetic processing part which computes a vehicle position in a vehicle-width direction, and a control part which controls a steering angle and vehicle speed so that the vehicle position is at the center of a lane. The above-described recognition part recognizes left and right lane marks based on the results of the image processing by the image processing part. Also, the above-described arithmetic processing part computes the vehicle position in the vehicle-width direction in the lane based on the results of recognizing the lane marks.

Also, the installation vehicle includes a line detecting part which detects the marking line ML. The line detecting part is configured to include a one-dimensional line sensor and an arithmetic processing part which processes one-dimensional data outputted by the line sensor. The line sensor is attached to face the road surface. The arithmetic processing part processes one-dimensional data outputted by the liner sensor, thereby computing the position of the marking line ML in the vehicle-width direction. And, the above-described control part controls a traveling mechanism part including a steering unit and a driving motor as a prime motor so that the marking line ML can be detected at the center position of the line sensor.

In the marker installation method of the present embodiment, the above-described step (1) of forming the marking line ML is performed by the print vehicle traveling in an automated manner along the lane. If the marking fluid is dropped during automated traveling of the print vehicle, the marking line ML can be automatically formed efficiently.

Furthermore, in the above-described step (2) of setting the installation vehicle (one example of the installation device) with reference to the marking line, the installation vehicle automatically travels along the marking line ML and stops at constant intervals, thereby automatically laying out the installation vehicle with high accuracy.

In this manner, according to the installation method by the marker installation system of the present embodiment, automation of operation can be advanced, and labor saving can be achieved. If human cost can be suppressed by automation, cost of laying magnetic markers can be reduced.

Note that as for the print vehicle and the installation vehicle, a vehicle traveling by remote control such as radio control using wireless communication may be used.

Note that other configurations and operations and effects are similar to those of the first embodiment.

In the foregoing, specific examples of the present invention are described in detail as in the embodiments, these specific examples merely disclose examples of technology included in the scope of claims for patent. Needless to say, the scope of claims for patent should not be restrictively construed based on the configuration, numerical values and so forth of the specific examples. The scope of claims for patent includes techniques acquired by variously modifying, changing, or combining as appropriate the above-described specific examples by using known techniques, knowledge of a person skilled in the art, and so forth.

REFERENCE SIGNS LIST 1 installation system
10 magnetic marker (marker)
10F laying position
108 accommodation hole
11 laser range finder (surveying device)
11A surveying device
15 arithmetic unit (laying position identifying part)
2 installation cart (installation device)
2B vehicle body
20 hand push handle
21 boring drill (operation unit)
27 survey prism

The invention claimed is:

1. A marker installation method for laying a plurality of markers detected by a vehicle, the method comprising:
   setting a surveying device which measures a distance to a target at a reference position;
   when an operation for laying each respective marker among the plurality of markers is performed, measuring, by using the surveying device, a distance to an installation device which performs the operation for laying;
   identifying, using the distance measured, a position relation of a laying position where the respective marker is laid with respect to the reference position;
   identifying a position, which has the position relation identified with respect to the reference position, as the laying position of the respective marker;
   storing the laying position of the respective marker; and
   accumulating the stored laying position of the respective markers as laying information of the plurality of markers in a database.

2. The marker installation method in claim 1, wherein the surveying device includes at least two surveying devices which are set at different reference positions, and the position relation is identified based on distances to the installation device measured by the at least two surveying devices.

3. The marker installation method in claim 1, wherein the surveying device is able to measure the distance to the installation device and an azimuth where the installation device is positioned with respect to a reference azimuth, and
   the position relation is identified by the distance to the installation device measured by the surveying device and the azimuth where the installation device is positioned.

4. The marker installation method in claim 1, wherein while the installation device is able to provide laying positions at a plurality of locations without position change, the surveying device measures distances to the installation device for measurement points at at least two locations of the installation device, and
   an orientation of the installation device is identified by using the distances to the installation device measured by the surveying device for the measurement points at the at least two locations of the installation device, and thereby orientation of the laying positions at the plurality of locations are identified.

5. The marker installation method in claim 1, the method further comprising a step of forming a marker laying line indicating the laying position of the respective markers on a road surface, a step of setting the installation device with reference to the marker laying line, and a step of performing the operation for laying the respective markers.

6. The installation method in claim 5, wherein the step of forming the marker laying line is a step to be performed by an operation vehicle as traveling, the operation vehicle equipped with a tank which stores a marking fluid, which is a material for forming the marker laying line, and a dropping device which drops the marking fluid onto a road surface.

7. The marker installation method in claim 6, wherein the installation device includes a traveling mechanism part for movement and a control part which controls the traveling mechanism part, and the step of setting the installation device is performed by the control part controlling the traveling mechanism part.

8. A marker installation system for laying a plurality of markers detected by a vehicle, the system comprising:
   a surveying device set at a reference position to measure a distance to a target;
   an installation device including an operation unit which performs an operation for laying each respective marker among the plurality of markers;
   a laying position identifying part which identifies a position relation of a laying position where a respective marker is laid with respect to the reference position; and
   a database for storing information of laying positions of the respective markers, wherein
   the laying position identifying part is configured to identify the position relation of the laying position of the respective marker with respect to the reference position based on a distance to the installation device measured by the surveying device by taking the installation device performing the operation for laying the respective marker as a target, and to identify a position, which has the position relation identified with respect to the reference position, as the laying position of the respective marker,
   the database is configured to store the laying position of the respective markers, and to accumulate the stored laying position of the respective markers as laying information of the plurality of markers.

9. The marker installation system in claim 8, wherein the survey device includes at least two surveying devices which are set at different reference positions, and the laying position identifying part is configured to identify the position relation based on distances to the installation device measured by the at least two surveying devices.

10. The marker installation system in claim 8, wherein the surveying device is able to measure the distance to the installation device and an azimuth where the installation device is positioned, and
   the laying position identifying part is configured to identify the position relation by the distance to the installation device measured by the surveying device and the azimuth where the installation device is positioned.

11. The marker installation system in claim 8, wherein while the installation device is able to provide laying positions at a plurality of locations without position change, the surveying device measures distances to the installation device for measurement points at at least two locations of the installation device, and
   the laying position identifying part is configured to identify orientation of the installation device by using the distances to the installation device measured by the surveying device for the measurement points at the at least two locations of the installation device, and thereby orientation of the laying positions at the plurality of locations are identified.

12. The marker installation method in claim 2, wherein the surveying device is able to measure the distance to the installation device and an azimuth where the installation device is positioned with respect to a reference azimuth, and
the position relation is identified by the distance to the installation device measured by the surveying device and the azimuth where the installation device is positioned.

13. The marker installation method in claim 2, wherein while the installation device is able to provide laying positions at a plurality of locations without position change, the surveying device measures distances to the installation device for measurement points at at least two locations of the installation device, and
an orientation of the installation device is identified by using the distances to the installation device measured by the surveying device for the measurement points at the at least two locations of the installation device, and thereby orientation of the laying positions at the plurality of locations are identified.

14. The marker installation method in claim 3, wherein while the installation device is able to provide laying positions at a plurality of locations without position change, the surveying device measures distances to the installation device for measurement points at at least two locations of the installation device, and
an orientation of the installation device is identified by using the distances to the installation device measured by the surveying device for the measurement points at the at least two locations of the installation device, and thereby orientation of the laying positions at the plurality of locations are identified.

15. The marker installation method in claim 2, the method further comprising a step of forming a marker laying line indicating the laying position of the respective markers on a road surface, a step of setting the installation device with reference to the marker laying line, and a step of performing the operation for laying the respective markers.

16. The marker installation method in claim 3, the method further comprising a step of forming a marker laying line indicating the laying position of the respective markers on a road surface, a step of setting the installation device with reference to the marker laying line, and a step of performing the operation for laying the respective markers.

17. The marker installation method in claim 4, the method further comprising a step of forming a marker laying line indicating the laying position of the respective markers on a road surface, a step of setting the installation device with reference to the marker laying line, and a step of performing the operation for laying the respective markers.

18. The marker installation system in claim 9, wherein the surveying device is able to measure the distance to the installation device and an azimuth where the installation device is positioned, and
the laying position identifying part is configured to identify the position relation by the distance to the installation device measured by the surveying device and the azimuth where the installation device is positioned.

19. The marker installation system in claim 9, wherein while the installation device is able to provide laying positions at a plurality of locations without position change, the surveying device measures distances to the installation device for measurement points at at least two locations of the installation device, and
the laying position identifying part is configured to identify orientation of the installation device by using the distances to the installation device measured by the surveying device for the measurement points at the at least two locations of the installation device, and thereby orientation of the laying positions at the plurality of locations are identified.

20. The marker installation system in claim 10, wherein while the installation device is able to provide laying positions at a plurality of locations without position change, the surveying device measures distances to the installation device for measurement points at at least two locations of the installation device, and
the laying position identifying part is configured to identify orientation of the installation device by using the distances to the installation device measured by the surveying device for the measurement points at the at least two locations of the installation device, and thereby orientation of the laying positions at the plurality of locations are identified.

21. The marker installation method in claim 1, the method further comprising a step of storing deviation information, which represents a deviation in the laying position of the respective marker, linked to identification information of the respective marker, to enable position correction on a vehicle which acquires a position by using the respective marker.

22. The marker installation system in claim 8, wherein a storage device is provided for storing deviation information, which represents a deviation in the laying position of the respective marker, linked to identification information of the respective marker, to enable position correction on a vehicle which acquires a position by using the respective marker.

* * * * *